(12) United States Patent
Stuiber et al.

(10) Patent No.: US 12,257,981 B2
(45) Date of Patent: Mar. 25, 2025

(54) HOLDER FOR A CENTER CONSOLE OF A VEHICLE

(71) Applicant: GRAMMER AG, Ursensollen (DE)

(72) Inventors: Martin Stuiber, Stulln (DE); Aly Kone, Röthenbach a. d. Pegnitz (DE); Peter Eidenhammer, Hohenburg (DE); Matthias Wagner, Hahnbach (DE)

(73) Assignee: GRAMMER AG, Ursensollen (DE)

( * ) Notice: Subject to any disclaimer, the term of this patent is extended or adjusted under 35 U.S.C. 154(b) by 296 days.

(21) Appl. No.: 17/969,040

(22) Filed: Oct. 19, 2022

(65) Prior Publication Data

US 2023/0128942 A1 Apr. 27, 2023

(30) Foreign Application Priority Data

Oct. 21, 2021 (DE) .................... 20 2021 105 776.9

(51) Int. Cl.
*B60R 7/04* (2006.01)

(52) U.S. Cl.
CPC ..................... *B60R 7/04* (2013.01)

(58) Field of Classification Search
CPC .......................... B60R 7/04; B60R 2011/0005
USPC ............................................. 296/24.34, 37.8
See application file for complete search history.

(56) References Cited

U.S. PATENT DOCUMENTS

| 7,658,357 B2 * | 2/2010 | Babian | .................... B60R 11/00 |
| | | | 248/176.1 |
| 8,414,047 B2 * | 4/2013 | Vasko | ....................... B60R 7/04 |
| | | | 296/24.3 |

FOREIGN PATENT DOCUMENTS

| DE | 10257123 A1 | 6/2004 |
| DE | 102010001447 A1 | 8/2011 |
| DE | 102013004632 A1 | 9/2014 |

* cited by examiner

*Primary Examiner* — Dennis H Pedder
(74) *Attorney, Agent, or Firm* — LUCAS & MERCANTI, LLP; Klaus P. Stoffel

(57) ABSTRACT

The holder for a center console, including a first fastening region for fastening to the vehicle body as well as a second fastening region for fastening to the center console, wherein the first fastening region and the second fastening region are connected by at least one arm extending in the Z-direction. The arm has a primary region with a first center axis and at least one secondary region with a second center axis which form relative to one another at least one bend point, which permits deformation of the primary region relative to the secondary region and thus a movement of the first fastening region relative to the second fastening region in the Z-direction.

10 Claims, 5 Drawing Sheets

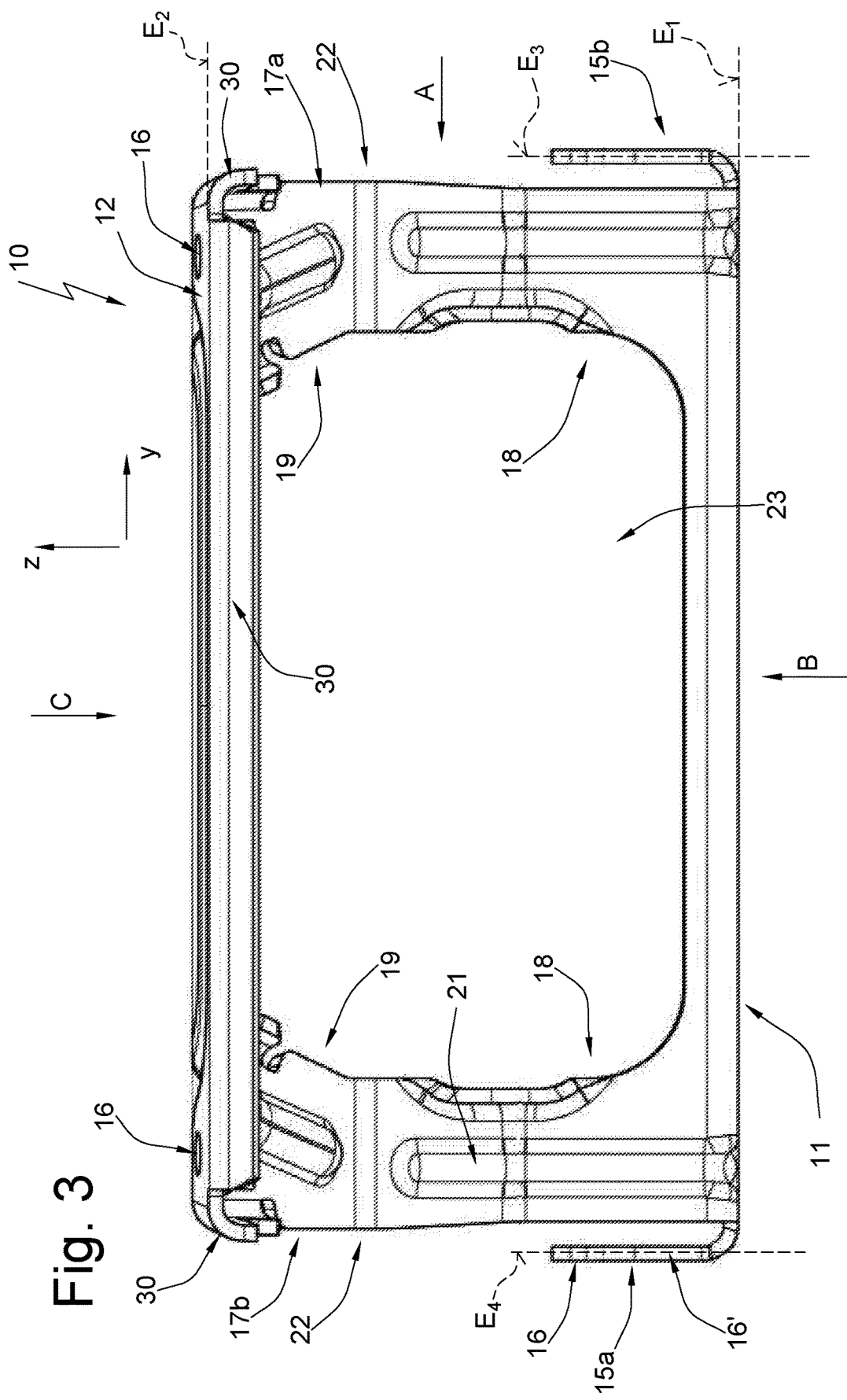

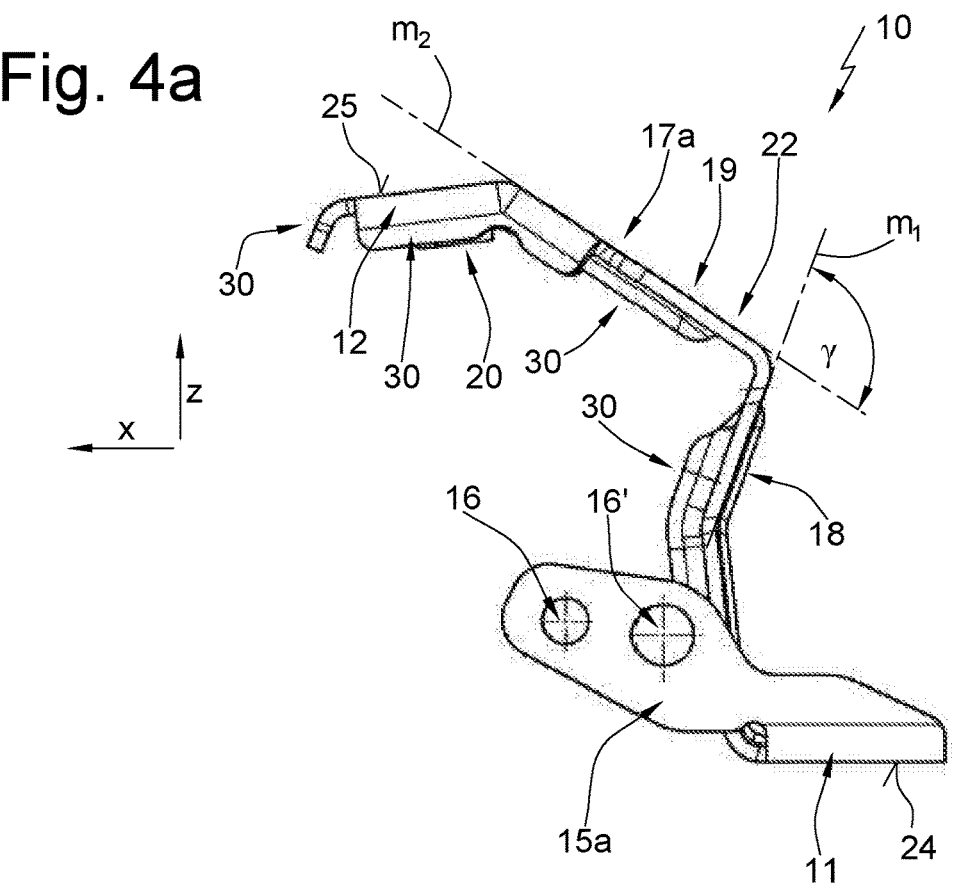
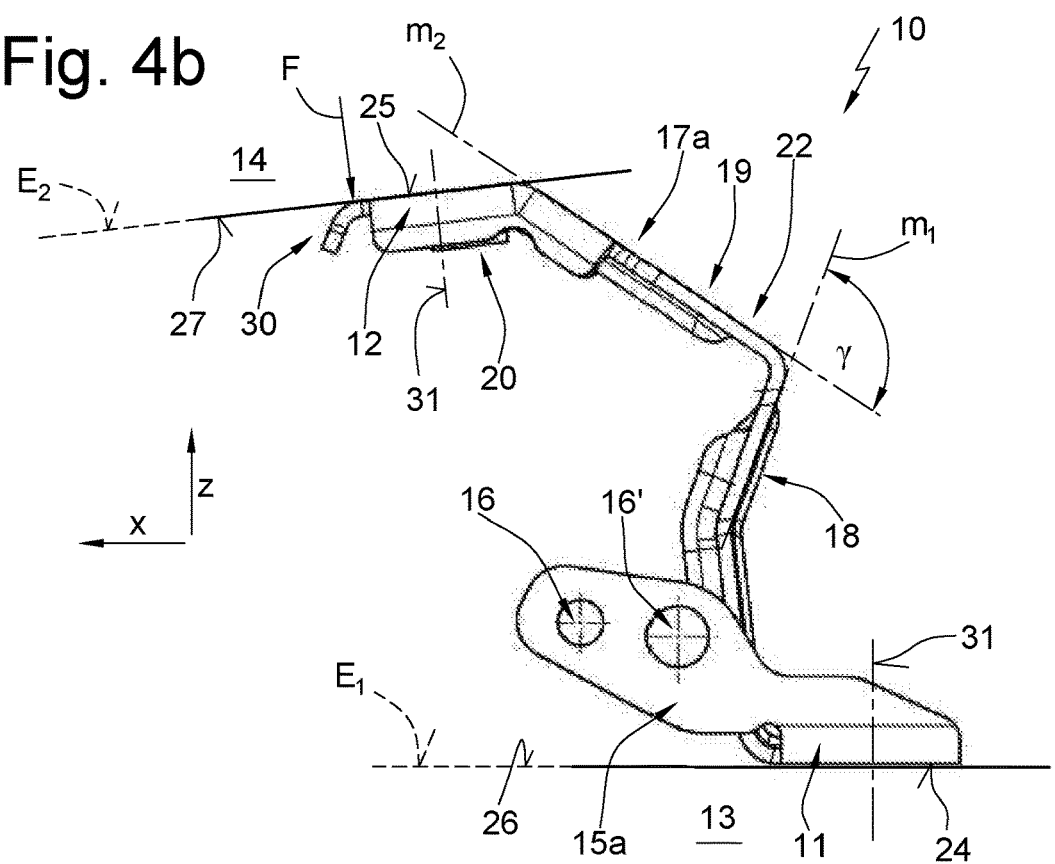

HOLDER FOR A CENTER CONSOLE OF A VEHICLE

CROSS-REFERENCE TO RELATED APPLICATIONS

The present application which claims priority of DE 20 2021 105 776.9, filed Oct. 21, 2021, the priority of the application is hereby claimed and this application is incorporated herein by reference.

BACKGROUND OF THE INVENTION

The invention relates to a holder for a center console of a vehicle. Within the meaning of the invention, a vehicle is, for example, a land vehicle, an aircraft or a water-craft.

Such a holder is known from public prior use. The console is made of at least one plastics part, which is fastened to the vehicle body by means of a rigid holder made of a plastics material. In order to compensate for the manufacturing tolerances, tolerance compensation elements have been used. In particular in the case of long parts, such as, for example, center consoles, considerable tolerances sometimes occur, which made it necessary to use such compensation elements.

DE 102 57 123 A1 discloses a center console part for a vehicle, in which a holder is made not of a steel sheet but of plastics material. Flexible shaping of the holder and inexpensive manufacture are thus possible. With regard to the tolerances that are to be maintained, no improvement is achieved with this solution.

DE 10 2013 004 632 A1 describes a mounting element for a center console of a motor vehicle, wherein the tolerance compensation device is formed by a supporting element which is pivotable in two bearing points of a profile flange about a pivot axis extending in the vehicle transverse direction, is contactable with the center console and can be fixed in the resulting pivot position. The means for fixing is formed, for example, by a fastening screw, which passes through a slot extending in the pivot direction of the supporting element.

DE 10 2010 001 447 A1 describes a center console which has a fastening dome on the bottom of which there is arranged an elastically movable lug. The purpose of the lug is to permit a controlled movement of the center console relative to the bottom of the motor vehicle in the event of an accident. The lug additionally ensures tolerance compensation on installation of the center console. The lug can be mounted, for example, on a bellows or on arms of a meandering shape, which are configured to be elastically movable. Tolerance compensation in the X-direction and in the Z-direction is possible in this way.

SUMMARY OF THE INVENTION

The object of the invention was to provide a holder for a center console which can be produced with a low outlay in terms of material and with which adaptation to the tolerance range of the center console is possible.

The holder is provided for holding a center console of a vehicle. It comprises a first fastening region for direct or indirect fastening to the vehicle body as well as a second fastening region for fastening to the center console. The first fastening region and the second fastening region are connected by means of at least one arm extending between the first fastening region and the second fastening region. Two or more than two arms can be provided, for example.

Each arm has a primary region with a first center axis and at least one secondary region with a second center axis, wherein the center axes form at least one bend point, which permits elastic deformation of the primary region relative to the secondary region and thus movability of the first fastening region relative to the second fastening region in the Z-direction.

The holder according to the invention has the advantage that it can be produced with relatively low outlay and permits tolerance compensation for the center console without additional means.

The first and second center axes form, for example, an angle of between 90° and 120°. In this case, a large force component of the force introduced into the secondary region acts as torque on the primary region and causes elastic deformation.

The first fastening region forms, for example, a substantially rigid, that is to say unmovable, connection with the primary region of the at least one arm. The connection between the second fastening region and the secondary region of the arm is, for example, also substantially rigid.

At least the arm of the holder is formed of a metal sheet, in particular of a steel sheet. Because the arm of the holder or the entire holder is made of a metal sheet, the arm has good elastic deformability.

The steel sheet is, for example, a sheet of a spring steel. In this case, the steel sheet has particularly good elastic deformability.

The first fastening region and the second fastening region are connected together, for example, by at least two arms. In the case of a plurality of arms, one of the arms can differ from the other arm in terms of construction such that it carries out a specific movement in the event of an extraordinary application of force—for example in the event of a vehicle collision-so that the center console performs a defined movement. The risk of injury to the occupants of the vehicle can thus be reduced. In addition, higher forces can be transmitted between the second fastening region and the first fastening region with at least two arms.

Each arm has, for example, at least two bend points. The arm can be configured such that a desired introduction of force into the secondary region of the arm takes place. The arm can additionally be configured such that the transmission of force from the primary region to the first fastening region is adapted to the requirements. For that purpose, the arm can have two or more bend points.

At least one fastening region is provided, for example, with at least one fastening lug, wherein the fastening region permits fastening in a first plane and the fastening lug permits fastening in at least a second plane. The first plane forms, for example, an angle with the second plane. By means of the fastening lug, a flexible additional fastening to the structure of the vehicle body and/or the center console is possible.

The holder is, for example, configured in one piece. It can be formed, for example, in one part by a metal part. Simple and inexpensive production of the holder is thus possible.

The holder as a whole can be in the form of, for example, a stamped and bent part.

At least one fastening region is provided, for example, for stiffening with respect to a y-direction, with a bead and/or a fold which extends in the y-direction. Deformation of the fastening region can be reduced in this way.

At least one fastening region is provided, for example, relative to a region of the arm for stiffening with at least one bead and/or at least one fold, which extends from the fastening region over the region of the arm. A relative movement between the fastening region and the region of the arm can thus be prevented.

An exemplary embodiment of the invention is described by way of example in the following description of the figures, also with reference to the schematic drawings. For the sake of clarity, identical or comparable parts or elements or regions are designated with identical reference characters, in some cases with the addition of lowercase letters.

Features which are described, shown or disclosed only in relation to one exemplary embodiment can also be provided within the scope of the invention in any other exemplary embodiment of the invention. Such modified exemplary embodiments—even if they are not shown in the drawings—are within the scope of the invention.

All the disclosed features are in themselves essential to the invention. The disclosed content of the cited publications and of the described devices of the prior art is hereby incorporated in its entirety into the disclosure of the application, also for the purpose of incorporating individual or multiple features of the subject-matter disclosed therein into one or into multiple of the claims of the present application. Such modified exemplary embodiments—even if they are not shown in the drawings—are also included in the invention.

BRIEF DESCRIPTION OF THE DRAWING

In the drawings:

FIG. 3 is a front view of the holder according to the invention, FIG. 4a is a view according to view arrow A in FIG. 3, FIG. 4b is a view according to FIG. 4a, wherein regions of a vehicle body and of the center console are shown.

DETAILED DESCRIPTION OF THE INVENTION

Figure 1:
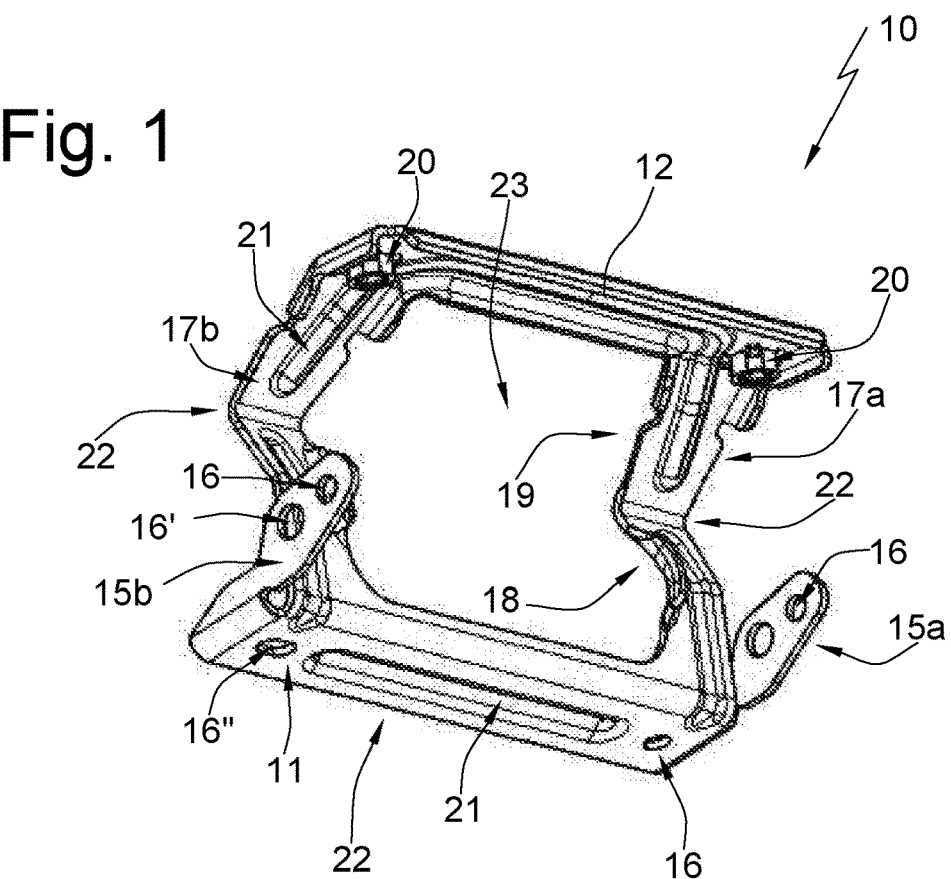
FIG. 1 is a perspective view of the holder obliquely from beneath.

The holder as a whole is designated with reference character 10.

Figure 2:
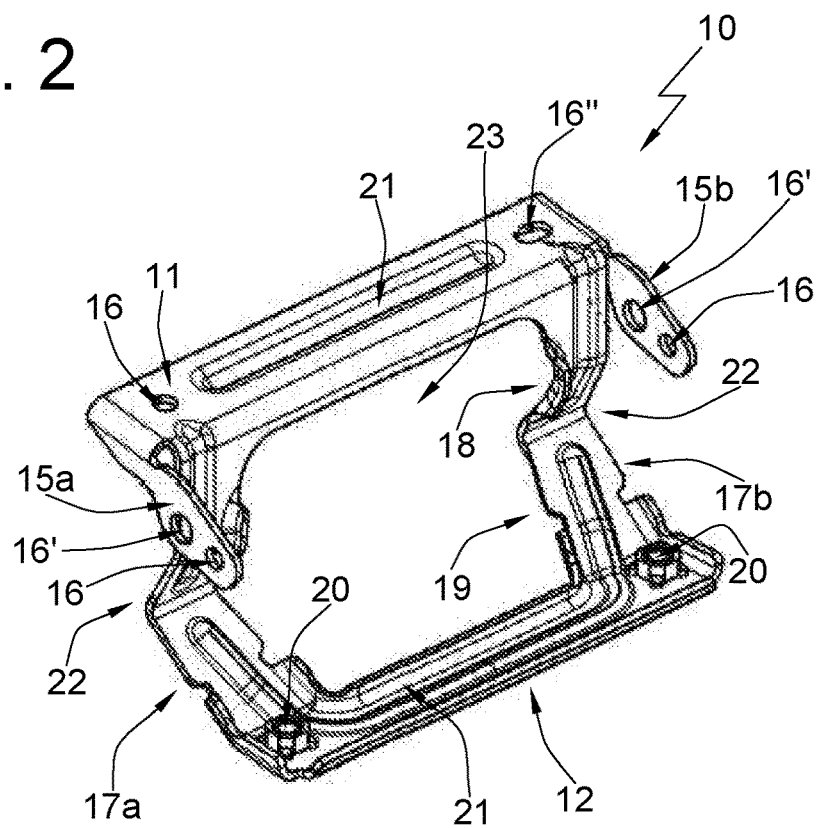
FIG. 2 is a different perspective illustration of the holder obliquely from beneath.

In the present example, the holder 10 is configured as a one-part stamped and bent part and comprises according to FIGS. 1 and 2 a first fastening region 11 and a second fastening region 12. The holder 10 can be fastened to the vehicle body 13 by means of the first fastening region 11. The second fastening region 12 is provided for fastening to a center console 14 (not shown in FIG. 1).

The fastening regions 11 and 12 are formed in the present exemplary embodiment by straight profile webs extending in the y-direction. They can, however, alternatively also be configured differently. If, for example, the mating surfaces of the vehicle body and/or of the center console to which the fastening regions 11 and 12 are fastened have a special structure, the fastening regions 11 and 12, for example, can be correspondingly adapted.

The fastening regions 11 and 12 have openings 16 and 16" which permit the passage of a screw and thus a screw fastening. In the present exemplary embodiment, the first fastening region 11 and the second fastening region 12 are formed approximately parallel in respect of the extent in the y-direction. It is thus possible to fasten the first fastening region 11 in a first plane E1 and the second fastening region 12 in a second plane E2 which is at a distance from the plane E1 with respect to a z-direction.

An arm 17a and an arm 17b extend in the Z-direction between the fastening regions 11 and 12. Each arm 17a and 17b comprises a primary region 18 with a longitudinal center line m1 as well as a secondary region 19 with a longitudinal center line m2. The primary region 18 is associated with the fastening region 11 and the secondary region 19 is associated with the fastening region 12. The regions 18 and 19 form an angle γ. As a result of the angle γ, an elastic deformation between the center line m1 of the region 18 and the center line m2 of the region 19, which intersect at a bend point 22, can occur in the event of a load F on the fastening region 12.

The angle γ is, for example, between 90° and 120°. With this angular range, a large torque is generated in the secondary region 19 in the event of a load F acting on the primary region, resulting in elastic deformation of said region. The regions 18 of the arms 17a and 17b are connected together in the y-direction by the fastening region 11, and the regions 19 of the arms 17a and 17b are connected together by means of the fastening region 12.

The fastening region 11 and the primary region 18 connected thereto are relatively rigid with respect to one another. Likewise, the fastening region 12 is relatively rigid, that is to say unmovable, with respect to the secondary region 19 connected thereto. For stiffening, beads 21 are formed. It can be seen in FIG. 3 that a bead 21 extends from the fastening region 11 into the primary region 18. A bead 21 additionally extends from the fastening region 12 into the secondary region 19. In this way, the rigidity between the first fastening region 11 and the primary region 18 and also between the second fastening region 12 and the secondary region 19 is enhanced.

In addition, edge regions 28 of the fastening regions 11 and 12 and also edge regions 29 of the arms 17a and 17b are provided with a fold 30. The elastic deformation takes place between the regions 18 and 19 of the arms 17a and 17b. The region 22 of the arms 17a and 17b thus acts like an imaginary hinge, which ensures the relative movability of the fastening regions 11 and 12 in the Z-direction.

In the present case, the fastening region 11 has projections 15a and 15b. These permit fastening to walls which lie in planes E3 and E4 (see FIG. 3), wherein the planes E3 and E4 are arranged at a right angle to the planes E1 and E2. For fastening to the vehicle body 13, the projections 15a and 15b have openings 16 and 16'. The projections 15a and 15b are provided in this exemplary embodiment for a rigid connection to the vehicle body but could be omitted according to an alternative form.

FIG. 4a shows a side view of the holder 10. FIG. 4b shows the fastening of a surface 24 of the fastening region 11 to a mating surface 26 of the vehicle body 13 and also the fastening of a surface 25 of the fastening region 12 to a mating surface 27 of the center console 14. A screw fastening 31 is indicated simply by dot-and-dash lines. For fastening to the center console 14, sleeves 20 are provided, the function of which is not essential for the invention. In FIG. 4b, the angle γ between the regions 18 and 19 is easily discernible.

Figure 5:
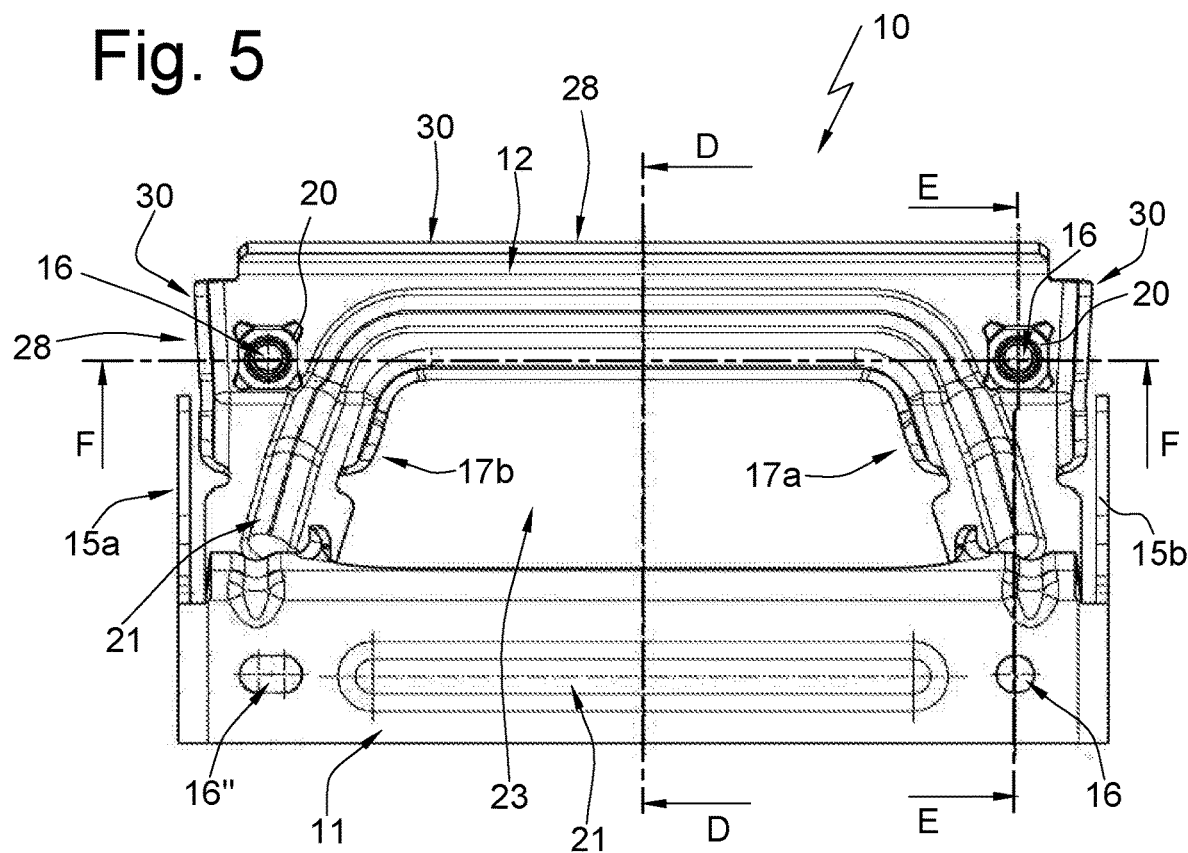
FIG. 5 is a view according to view arrow B in FIG. 3.
Figure 6:
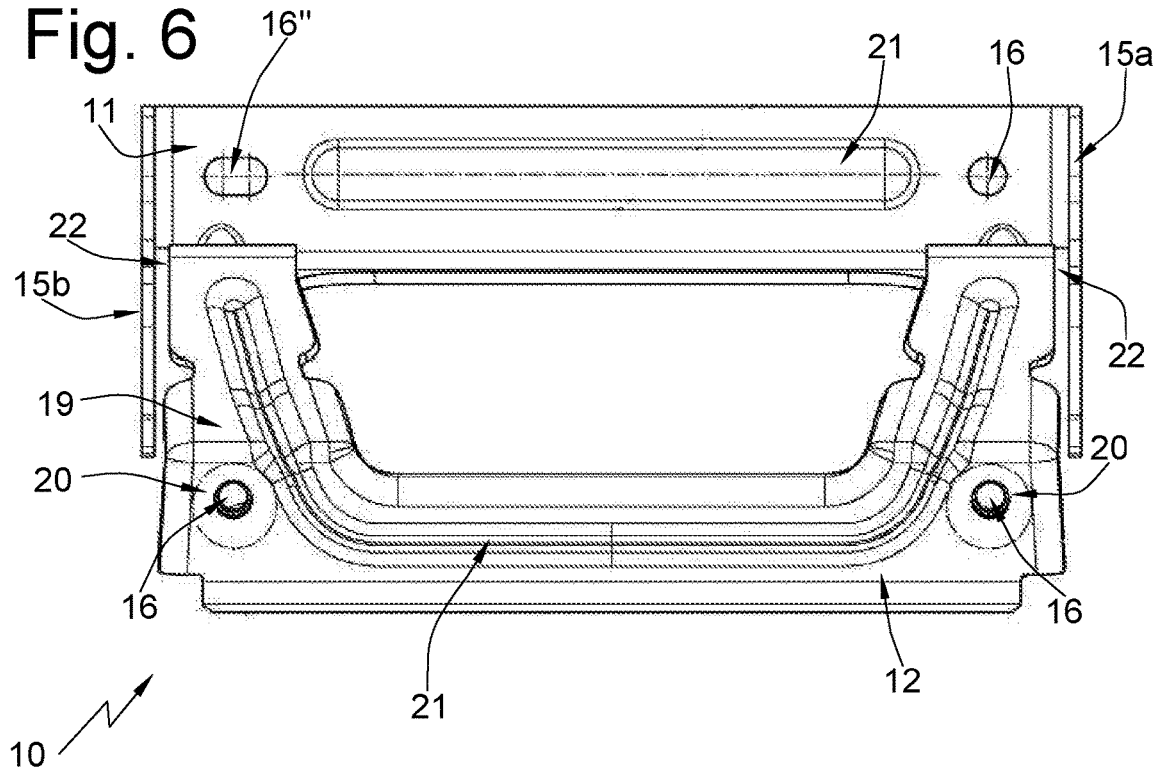
FIG. 6 is a view according to view arrow C in FIG. 3.

It can be seen in FIGS. 5 and 6 that a bead 21 extends in the y-direction over the fastening region 12 and into the secondary regions 19 of the arms 17a and 17b and results in stiffening of the holder 10 in the y-direction. The fastening region 11 is also provided with a bead 21 extending in the y-direction. A space 23 is discernible between the arms 17a and 17b.

Figure 7:
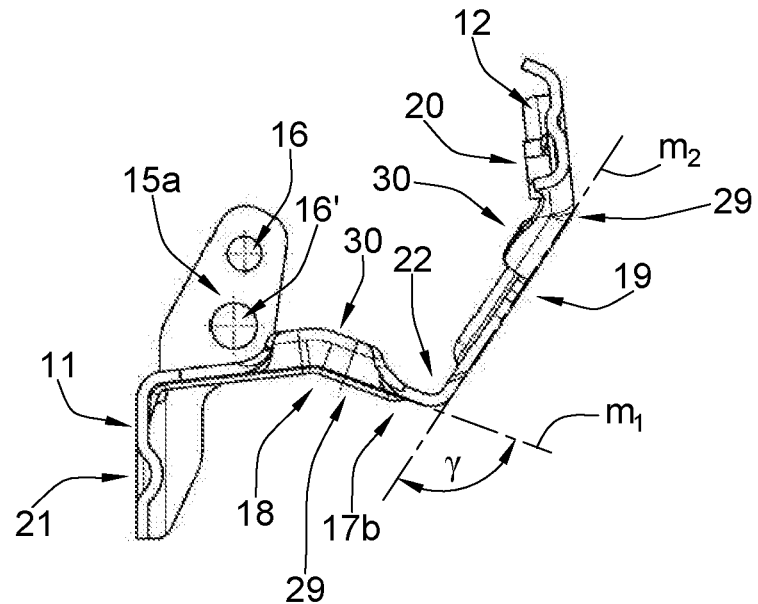
FIG. 7 is a sectional view according to section line D-D in FIG. 5.
Figure 8:
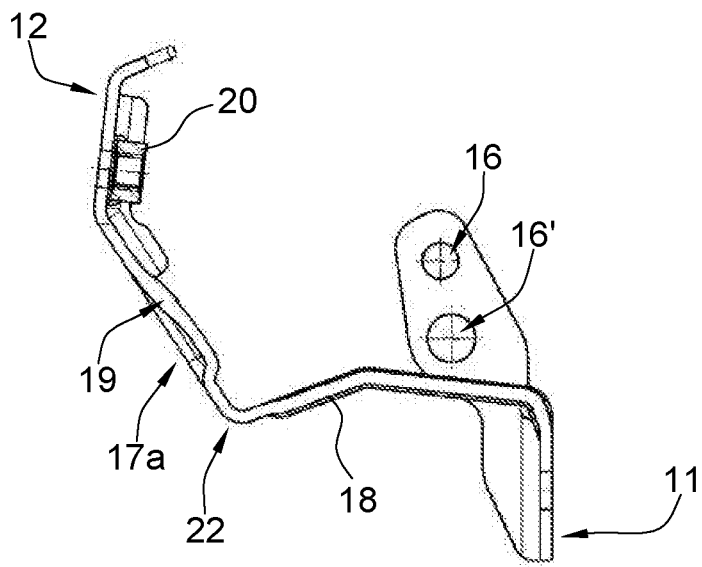
FIG. 8 is a sectional view according to section line E-E in FIG. 5.
Figure 9:
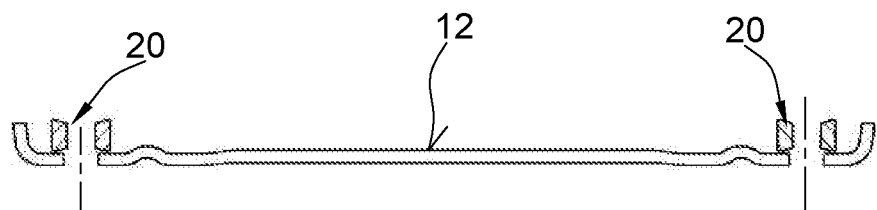
FIG. 9 is a sectional view according to section line F-F in FIG. 5.

In the view according to FIG. 7, the folds 30 can be seen, which result in the stiffening of the fastening regions 11 and 12 and also of the regions 18 and 19, wherein the region of the bend point 22 is left open for the possibility of elastic deformation and has neither beads 21 nor folds 30.

Overall, the holder 10 has high rigidity with respect to an x- and y-direction and also elastic deformability in respect of the z-direction.

The invention claimed is:

1. A holder for a center console of a vehicle, comprising: a first fastening region for fastening to a vehicle body; a second fastening region for fastening to the center console; and at least one arm that extends in a Z-direction and connects the first fastening region and the second fastening region, wherein the at least one arm comprises a primary region with a first center axis and at least one secondary region with a second center axis which form relative to one another at least one bend point that permits deformation of the primary region relative to the secondary region and thus a movement of the first fastening region relative to the second fastening region in the Z-direction, wherein the holder is configured in one piece.

2. The holder according to claim 1, wherein, at the bend point, the primary region forms an angle of between 90° and 120° with the secondary region.

3. The holder according to claim 1, wherein the first fastening region is configured to be substantially rigid relative to the primary region, and the second fastening region is configured to be substantially rigid relative to the secondary region.

4. The holder according to claim 1, wherein the arm is formed of a steel sheet.

5. The holder according to claim 4, wherein the steel sheet is a sheet of spring steel.

6. The holder according to claim 1, wherein the at least one arm includes at least two arms that connect the first fastening region and the second fastening region together.

7. The holder according to claim 1, wherein the at least one arm comprises at least two bend points.

8. The holder according to claim 1, wherein the first fastening region is provided with at least one fastening lug, wherein the first fastening region permits fastening in a first plane and the fastening lug permits fastening in at least a second plane.

9. The holder according to claim 1, wherein at least one of the fastening regions is stiffened in respect of a y-direction by a bead and/or by a fold.

10. The holder according to claim 1, wherein at least one of the fastening regions is stiffened relative to a region of the at least one arm by a bead and/or by a fold.

\* \* \* \* \*